United States Patent
Fujii et al.

(10) Patent No.: US 6,250,093 B1
(45) Date of Patent: Jun. 26, 2001

(54) AIR CONDITIONING SYSTEM AND COMPRESSOR

(75) Inventors: Toshiro Fujii; Takanori Okabe; Naoya Yokomachi, all of Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/338,824

(22) Filed: Jun. 23, 1999

(30) Foreign Application Priority Data

Jun. 25, 1998 (JP) .................................................. 10-179265

(51) Int. Cl.[7] ............................... F25B 1/00; F25B 49/00
(52) U.S. Cl. ......................... 62/228.3; 62/159; 62/196.4; 62/197; 62/210; 62/228.5
(58) Field of Search ................................ 62/228.3, 228.5, 62/228.1, 194.6, 197, 159, 226, 210; 236/91 R, 91 C

(56) References Cited

U.S. PATENT DOCUMENTS

| | | | |
|---|---|---|---|
| 4,330,999 | * | 5/1982 | Nakayama ............................. 62/217 |
| 4,687,419 | * | 8/1987 | Suzuki et al. ........................ 417/222 |
| 4,780,059 | * | 10/1988 | Taguchi ................................ 417/222 |
| 4,880,356 | * | 11/1989 | Suzuki et al. .......................... 417/53 |
| 4,882,909 | * | 11/1989 | Terauchi ................................ 62/209 |
| 4,890,985 | | 1/1990 | Sugiura . |
| 4,905,477 | * | 3/1990 | Takai .................................. 62/196.3 |
| 5,065,589 | * | 11/1991 | Taguchi ................................ 62/161 |
| 5,070,707 | * | 12/1991 | Ni ....................................... 62/234 |
| 5,076,068 | * | 12/1991 | Mikhail ................................ 62/215 |
| 5,189,886 | * | 3/1993 | Terauchi .............................. 62/228.5 |
| 5,291,941 | | 3/1994 | Enomoto et al. . |
| 5,577,894 | | 11/1996 | Kawaguchi et al. . |
| 5,653,119 | * | 8/1997 | Kimura et al. ....................... 62/228.5 |
| 5,823,000 | * | 10/1998 | Takai .................................... 62/133 |
| 6,058,728 | * | 5/2000 | Takano et al. ....................... 62/196.4 |
| 6,076,366 | * | 6/2000 | Takano et al. ....................... 62/196.4 |

FOREIGN PATENT DOCUMENTS

| | | |
|---|---|---|
| 4439 512 A1 | 5/1995 | (DE) . |
| 197 09 935A1 | 11/1997 | (DE) . |
| 5-223357 | 8/1993 | (JP) . |

OTHER PUBLICATIONS

Patent Abstracts of Japan Publication No. 10205446, published Aug. 4, 1998.
Patent Abstracts of Japan Publication No. 10205441, published Aug. 4, 1998.

* cited by examiner

Primary Examiner—Corrine McDermott
Assistant Examiner—Marc Norman
(74) Attorney, Agent, or Firm—Morgan & Finnegan, L.L.P.

(57) ABSTRACT

An improved air conditioning system that cools or heats air very rapidly after being started. The system includes a main heater and a cooler which also functions as an auxialy heater. The cooler includes a variable displacement compressor for compressing refrigerant gas. The compressor has a crank chamber and a discharge chamber. A crank mechanism is accommodated in the crank chamber. Compressed refrigerant gas is supplied to an external refrigerant circuit via the discharge chamber. The discharge chamber is connected to the external refrigerant circuit by a passage. A throttle valve is located in the passage. The throttle valve closes the passage immediately after the compressor is started, which quickly increases the pressure of the discharge chamber. As a result, the displacement of the compressor is increased quickly, and rapid heating or cooling results.

19 Claims, 5 Drawing Sheets

Fig.2

AIR CONDITIONING SYSTEM AND COMPRESSOR

BACKGROUND OF THE INVENTION

The present invention relates to an apparatus for air conditioning. Particularly, the present invention pertains to an air conditioning system for vehicles and a compressor used therein.

For example, Japanese Unexamined Patent Publication No. 5-223357 discloses such a vehicle air conditioning system. The air conditioning system includes a main heater and a cooler. The main heater uses engine coolant (hot water). The cooler also functions as an auxiliary heater that uses heated gas to heat the passenger compartment. The cooler includes an external refrigerant circuit and a compressor, which is driven by a vehicle engine. The external refrigerant circuit connects a discharge chamber (discharge pressure zone) with a suction chamber (suction pressure zone), which are defined in the compressor. The external refrigerant circuit includes a condenser, an expansion valve and an evaporator, which are arranged sequentially from the discharge pressure zone to the suction pressure zone. The discharge pressure zone of the compressor is also connected with the evaporator by a bypass, which bypasses the condenser and the expansion valve. A decompression device is located in the bypass. The passage between the discharge pressure zone and the suction pressure zone is switched by a switch valve. Specifically, the switch valve switches between a route including the condenser and the expansion valve and a route including the bypass, which bypasses the condenser and the expansion valve.

When the engine is started, the temperature of the coolant is low. Therefore, the main heater is unable to supply warm air to the passenger compartment. When the temperature of the coolant is low, the cooler is controlled to function as an auxiliary heater. Specifically, the switch valve selects the route that bypasses the condenser and the expansion valve. Then, high pressure, high temperature refrigerant gas discharged from the compressor is provided to the evaporator via the bypass and the decompression device. The heat of the gas is transferred by the evaporator. The heat of the refrigerant gas is added to the heat produced by the main heater, which allows the air conditioning system to quickly send warm air to the passenger compartment.

A typical prior art air conditioning system includes a variable displacement compressor 60 illustrated in FIG. 6. A suction chamber 61, a discharge chamber 62 and a crank chamber 63 are defined in the compressor 60. Cylinder bores 64 are formed in a cylinder block 65. Each cylinder bore 64 houses a piston 66. A drive shaft 67 is rotatably supported by the compressor housing. The drive shaft 67 is driven by a vehicle engine 68. A swash plate 69 is supported by the drive shaft 67 in the crank chamber 63 to be tiltable relative to the drive shaft 67. The pistons 66 are engaged with the swash plate 69. A supply passage 70 communicates the discharge chamber 62 with the crank chamber 63. A bleeding passage 71 communicates the crank chamber 63 with the suction chamber 61. A control valve 72 is located in the supply passage 70.

Rotation of the drive shaft 67 is converted to linear reciprocation of each piston 66 by the swash plate 69. Reciprocation of each piston 66 draws refrigerant gas from the suction chamber 61 to the associated cylinder bore 64. The gas is then compressed and discharged to the discharge chamber 62. The control valve 72 adjusts the flow rate of gas in the supply passage 70 thereby varying the pressure of the crank chamber 63. This changes the difference between the pressure of the crank chamber 63 and the pressure of the cylinder bores 64. Accordingly, the inclination of the swash plate 69 is changed.

When the control valve 72 opens the supply passage 70, highly pressurized gas in the discharge chamber 62 is supplied to the crank chamber 63, which increases the pressure of the crank chamber 63. The difference between the pressure of the crank chamber 63 and the pressure in the cylinder bores 64 decreases the inclination of the swash plate 69. This shortens the stroke of each piston and decreases the displacement of the compressor 60.

When the control valve 72 closes the supply passage 70, highly pressurized gas in the discharge chamber 62 is not supplied to the crank chamber 63. Since the crank chamber 63 is connected to the suction chamber 61, the pressure of which is relatively low, by the bleeding passage 71, the pressure of the crank chamber 63 is lowered. Then, the pressure of the cylinder bores 64 moves the swash plate 69 to increase the inclination of the swash plate 69. This lengthens the stroke of each piston 66 and increases the displacement of the compressor 60.

The compressor 60 has a spring 73 to urge the swash plate 69 in a direction decreasing the inclination. When the compressor 60 is stopped, the spring 73 moves the swash plate 69 to minimize the inclination. When the compressor 60 is started again, the displacement of the compressor 60 is minimum, which requires minimum torque. The shock caused by starting the compressor is thus reduced. If the nonoperational state of the compressor continues, the pressures in the chambers of the compressor 60 become equalized at a relatively low pressure. Therefore, when the compressor 60 is started again, it takes a relatively long time to maximize the cooling performance or the heating performance in the auxiliary heater. That is, the pressure in the discharge chamber 62 is increased slowly and it takes a relatively long time for the swash plate 69 to move from the minimum displacement position to the maximum displacement position. The compressor in the prior art air conditioning system is therefore slow to start functioning to cool the passenger compartment and slow to work as an auxiliary heater. When the temperature about the evaporator is low, the evaporator transfers a significant amount of heat from the gas. In other words, the work of the evaporator is increased. Therefore, the evaporator greatly lowers the pressure of the gas. In this case, it takes even longer time to increase the pressure of the discharge chamber 62. That is, it takes a relatively long time for the compressor 60 to start functioning as the auxiliary heater.

SUMMARY OF THE INVENTION

Accordingly, it is an objective of the present invention to provide an air conditioning system that is quick to start functioning as a cooler or a heater when started.

To achieve the foregoing and other objectives and in accordance with the purpose of the present invention, an air conditioning system for cooling or heating a space is provided. The system includes a compressor, a port, heat exchanger, a cooling circuit, a heating circuit, a selecting valve apparatus and a control valve. The compressor has a system for drawing in refrigerant gas, compressing the gas, and discharging the gas after compression. The compressed gas is supplied to an external circuit via the port. The external circuit includes the cooling circuit and the heating circuit. The heat exchanger cools or heats air supplied to the space. The cooling circuit includes a condenser that condenses the compressed refrigerant gas and supplies the condensed refrigerant gas to the heat exchanger. The heating circuit optionally supplies the compressed refrigerant gas to the heat exchanger. The selecting valve apparatus selectively connects the cooling circuit or the heating circuit to the heat exchanger. The control valve controls the cross-sectional area of the port to lower the discharge amount of the refrigerant gas discharged from the compressor.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2 is a cross-sectional view illustrating a compressor according to a first embodiment of the present invention;

DETAILED DESCRIPTION OF THE PREFERRED EMBODIMENTS

Figure 1:
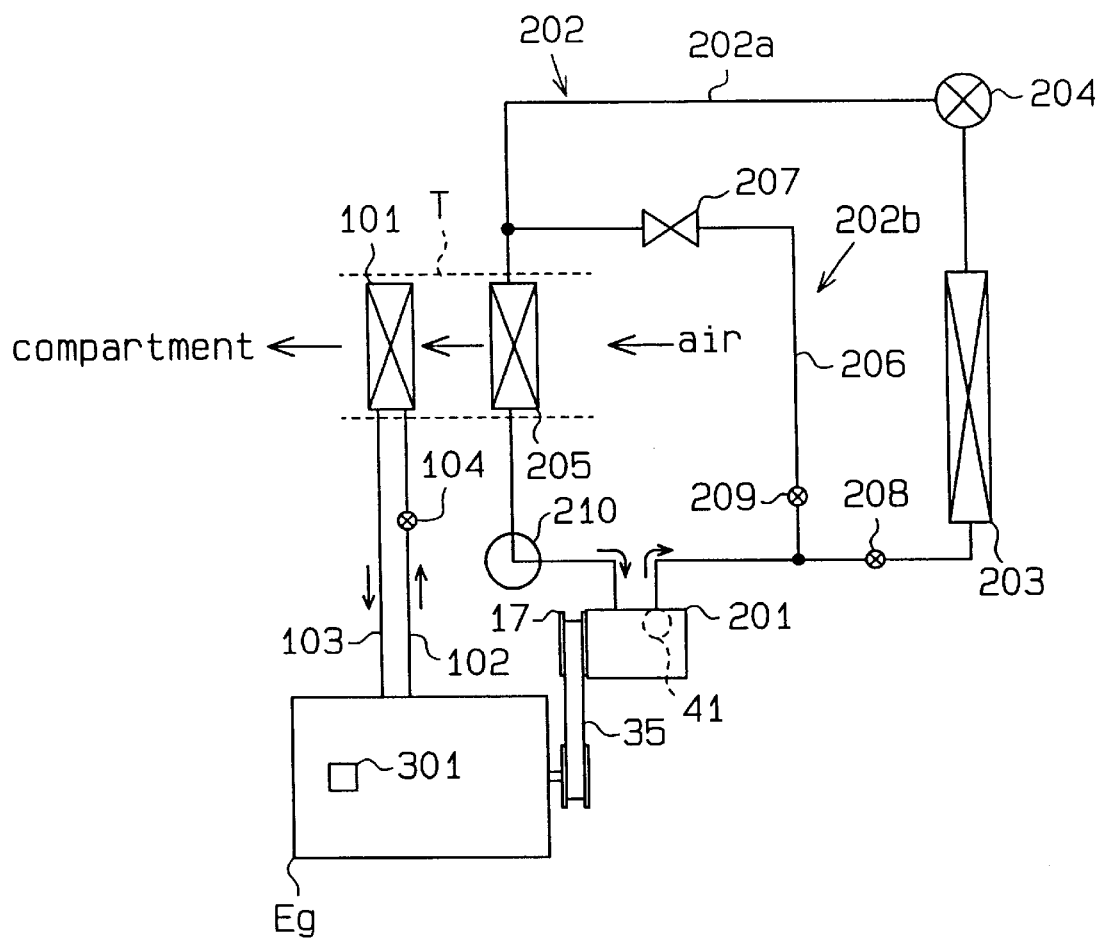
FIG. 1 is a schematic diagram illustrating a vehicle air conditioning system according to the present invention.

A vehicle air-conditioning system according to a first embodiment of the present invention will now be described with reference to the drawings.

Figure 2:
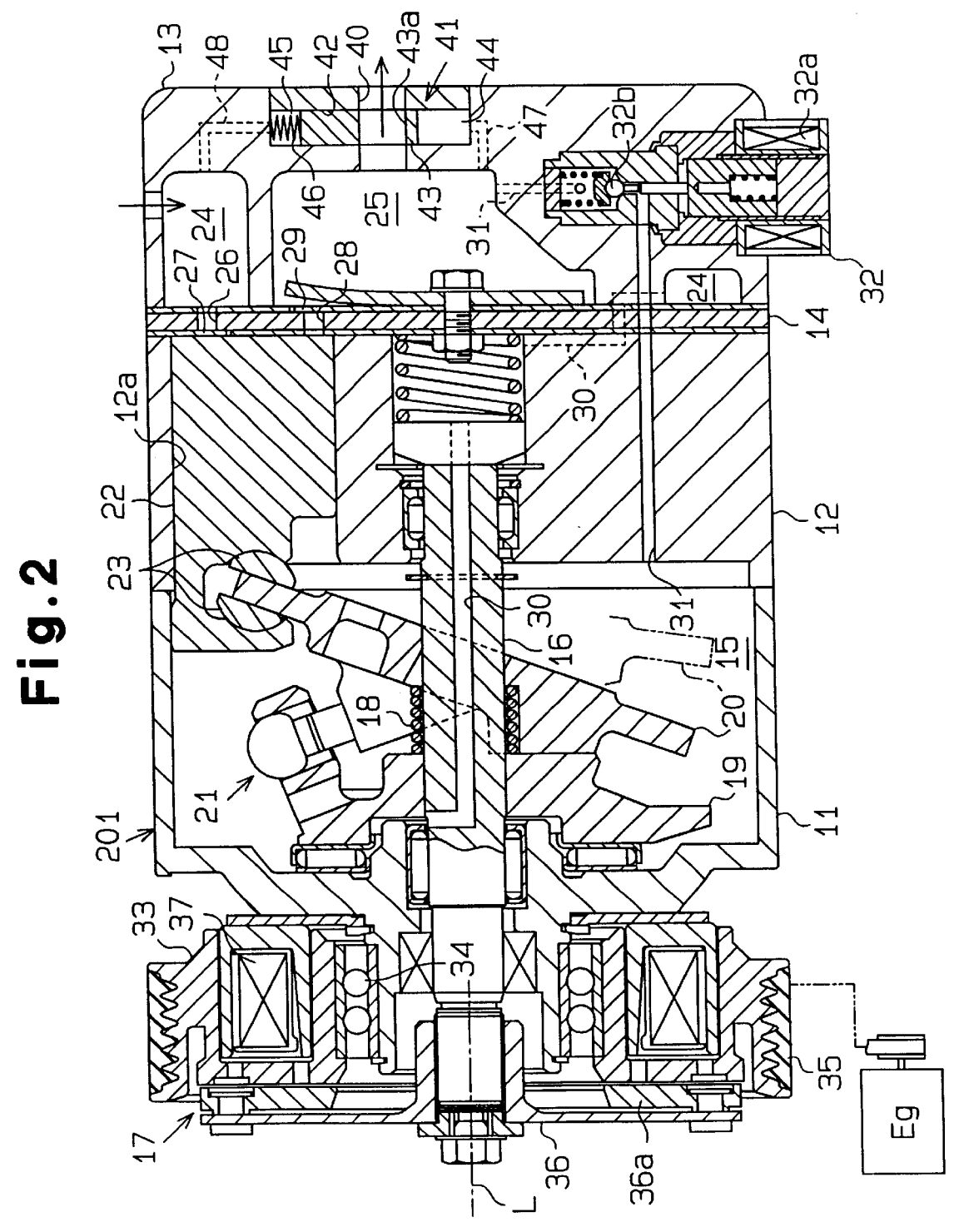

A compressor used in the air conditioning system will first be described. As shown in FIG. 2, a front housing 11 is secured to the front end face of a cylinder block 12. A rear housing 13 is secured to the rear end face of the cylinder block 12, and a valve plate 14 is located between the rear housing 13 and the rear end face. The front housing 11, the cylinder block 12 and the rear housing 13 form a compressor housing. A crank chamber 15 is defined by the inner walls of the front housing 11 and the front end face of the cylinder block 12.

A drive shaft 16 is rotatably supported in the front housing 11 and the cylinder block 12. The front housing 11 has a cylindrical wall extending forward. A pulley 33 is supported by the cylindrical wall with an angular bearing 34. The pulley 17 is coupled to an engine Eg by a belt 35. An electromagnetic clutch mechanism 17 is attached to the pulley 33. The clutch mechanism 17 includes a hub 36 fixed to the drive shaft 16, an armature 36a fixed to the hub 36 and a core 37 located in the pulley 33. When excited, the core 37 generates a magnetic field. The magnetic field causes the armature 36a to contact the pulley 33 while elastically deforming the hub 36, which transmits the power of the engine Eg to the drive shaft 16. When the core 37 is de-excited, the armature 36a is separated from the pulley 33 by the resilience of the hub 36. Thus, the power of the engine Eg is no longer transmitted to the drive shaft 16.

A rotor 19 is fixed to the drive shaft 16 in the crank chamber 15. A hinge mechanism 21 is located between the rotor 19 and the swash plate 20. The hinge mechanism 21 guides the movement of the swash plate 20 in the axial direction of the drive shaft 16 and the inclination of the swash plate 20 with respect to the drive shaft 16. The inclination of the swash plate 20 decreases as the swash plate 20 moves toward the cylinder block 12. The swash plate 20, the hinge mechanism 21 and the rotor 19 rotate integrally with the drive shaft 16.

A coil spring 18 is fitted about the drive shaft 16 and is located between the rotor 19 and the swash plate 20. The spring 18 urges the swash plate 20 rearward, or in a direction decreasing the inclination of the swash plate 20.

Cylinder bores 12a (only one is shown) extend through the cylinder block 12 about the drive shaft 16. A single-headed piston 22 is accommodated in each cylinder bore 12a. Each piston 22 is coupled to the swash plate 20 by way of a pair of shoes 23. The shoes 23 convert rotation of the swash plate 20 into reciprocation of each piston 22 in the associated cylinder bore 12a. Changes of the inclination of the swash plate 20 vary the stroke of each piston 22. Accordingly, the displacement of the compressor 201 is varied.

A suction pressure zone, or suction chamber 24, and a discharge pressure zone, or discharge chamber 25, are defined in the rear housing 13. The valve plate 14 has suction ports 26, suction valve flaps 27, discharge ports 28 and discharge valve flaps 29. As each piston 22 moves from the top dead center to the bottom dead center, refrigerant gas in the suction chamber 24 is drawn into the cylinder bore 12a through the associated suction port 26 and the associated suction valve flap 27. As each piston 22 moves from the bottom dead center to the top dead center, the gas in the associated cylinder bore 12a is compressed to a predetermined pressure. The gas is then discharged to the discharge chamber 25 through the associated discharge port 28 and the associated valve flap 29.

A bleeding passage 30 is formed in the drive shaft 16, the cylinder block 12 and the rear housing 13 to connect the crank chamber 15 with the suction chamber 24. A control passage, or supply passage 31, connects the discharge chamber 25 with the crank chamber 15. A control valve 32 is located in the supply passage 31. The control valve 32 includes a solenoid 32a and a valve body 32b. Excitation and de-excitation of the solenoid 32a closes and opens the supply passage 31. Controlling the control valve 32 changes the pressure of the crank chamber 15, which acts on the pistons 22. A change in the crank chamber pressure alters the pressure difference between the crank chamber 15 and the cylinder bores 12a, thereby changing the inclination of the swash plate 20.

When de-excited, the solenoid 32a opens the supply passage 31, which connects the discharge chamber 25 with the crank chamber 15. The supply passage 31 supplies highly pressurized gas in the discharge chamber 25 to the crank chamber 15, which increases the pressure of the crank chamber 15. An increase in the crank chamber pressure moves the swash plate 20 against the force of the pressure in the cylinder bores 12a in a direction decreasing the inclination of the swash plate 20. This shortens the stroke of each piston 22 and decreases the displacement of the compressor.

When excited, the solenoid 32a closes the supply passage 31, which releases gas in the crank chamber 15 to the suction chamber 24 through the bleeding passage 30. This lowers the pressure of the crank chamber 15. A decrease in the crank chamber pressure causes the swash plate 20 to be moved by the force of the pressure in the cylinder bores 12a in a direction increasing the inclination of the swash plate 20. This lengthens the stroke of each piston 22 and maximizes the displacement.

The air conditioning system of FIG. 1 will now be described. The system includes a main heater, or heater core 101, and a cooler 200, which also functions as an auxiliary heater. The main heater is a hot water heater that uses coolant from the engine Eg. The heater core 101 is located in an air duct T for conducting air to the passenger compartment. The heater core 101 is connected to a water jacket (not shown) of the engine Eg by a feed pipe 102 and a return pipe 103. Coolant from the engine Eg is conducted to the heater core 101 by the feed pipe 102. Coolant in the heater core 101 is returned to the engine water jacket by the return pipe 103. An electromagnetic valve 104 is located in the feed pipe 102. A temperature sensor 301 is located in the water jacket for detecting the temperature of coolant. The electromagnetic valve 104 and the temperature sensor 301 are connected to a computer 300 (see FIG. 3).

The cooler 200 functions as an auxiliary heater that uses heated gas in the refrigerant cycle. The cooler 200 includes an external refrigerant circuit 202 connecting the suction chamber 24 with the discharge chamber 25. The external refrigerant circuit 202 includes a condenser 203, an expansion valve 204, an evaporator 205 and an accumulator 210, which are arranged sequentially from the discharge chamber 25. The evaporator 205 is located adjacent to the heater core 101 in the duct T.

A bypass 206 connects the upstream portion of the condenser 203 with the upstream portion of the evaporator 205 by detouring the condenser 203 and the expansion valve 204. A decompression device, or orifice 207, is provided in the bypass 206.

In the first embodiment, a route of refrigerant that includes the condenser 203 and the expansion valve 204 is a cooling circuit 202a. On the other hand, a route that includes the bypass 206 and detours the condenser 203 and the expansion valve 204 is a heating circuit 202b. The cooling circuit 202a and the heating circuit 202b have a common portion. The evaporator 205 in the cooling circuit 202a also functions as a heat exchanger in the heating circuit 202b.

The cooling circuit 202a has a first switch valve 208 located between the branch point of the bypass 206 and the condenser 203. The heating circuit 202b has a second switch valve 209 located between the branch point of the bypass 206 and the orifice 207. The first and second switch valves 208, 209 switch the active path between the cooling circuit 202a and the heating circuit 202b.

Figure 3:
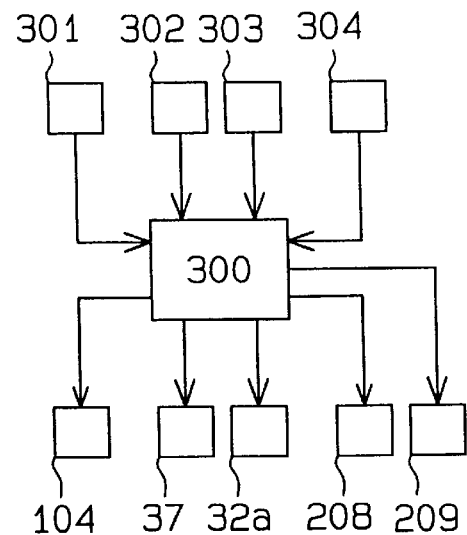
FIG. 3 is a schematic circuit diagram of the vehicle air conditioning system of FIG. 1.

An air conditioner switch 302, a temperature setter 303 and a compartment temperature sensor 304 shown in FIG. 3 are located in the passenger compartment and are connected to the computer 300. The computer 300 controls the electromagnetic valve 104, the electromagnetic clutch mechanism 17, the control valve 32 and the first and second switch valves 208, 209 in accordance with signals from the sensors 301, 304, the air conditioner switch 302 and the temperature setter 303 based on pre-stored programs.

Figure 4:
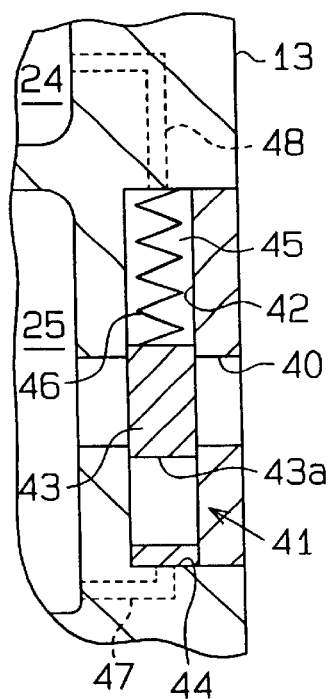
FIG. 4 is an enlarged partial cross-sectional view illustrating a closed throttle of the compressor shown in FIG. 2.

As shown in FIGS. 2 and 4, a discharge passage 40 is formed in the rear housing 13 to connect the discharge chamber 25 with the external refrigerant circuit 202. A throttle 41 is located in the discharge passage 40 to reduce the cross-sectional area of the discharge passage 40. The throttle 41 includes a valve body 43 and a spring 46. A valve body chamber 42 is formed transverse to the discharge passage 40. A valve body 43 is accommodated in the valve body chamber 42. The valve body 43 has a valve hole 43a. The valve body 43 is moved between an open position, where the valve hole 43a connects the discharge passage 40 with the discharge chamber 25, and a closed position, where the valve body 43 disconnects the discharge passage 40 from the discharge chamber 25.

A high pressure chamber 44 and a low pressure chamber 45 are defined in the valve body chamber 42 at the end faces of the valve body 43, respectively. A spring 46 is located in the low pressure chamber 45 to urge the valve body 43 toward the closed position. The high pressure chamber 44 is connected to the discharge chamber 25 by a first pilot passage 47. The low pressure chamber 45 is connected to the suction chamber 24 by a second pilot passage 48. Thus, the high pressure chamber 44 is exposed to the pressure of the discharge chamber 25 and the low pressure chamber 45 is exposed to the pressure of the suction chamber 24.

When the pressure in the high pressure chamber 44 is low and the pressure difference between the high pressure chamber 44 and the low pressure chamber 45 is smaller than a predetermined value, the valve body 43 is moved to the closed position by the spring 46 as shown in FIG. 4. That is, the discharge passage 40 is closed by the valve body 43. When the pressure in the high pressure chamber 44 is high and the pressure difference between the high pressure chamber 44 and the low pressure chamber 45 is equal to or greater than the predetermined value, the valve body 43 is moved to the open position against the force of the spring 46 as shown in FIG. 2. This opens the discharge passage 40.

The operation of the vehicle air conditioning system will now be described. When the engine Eg is running and the air conditioner switch 302 is turned on, the computer 300 compares the value set by the temperature setter 303 and the temperature detected by the compartment temperature sensor 304. The computer 300 selects the cooling mode if the detected temperature is higher than the set temperature and selects the heating mode if the detected temperature is lower than the set temperature.

If the cooling mode is selected, the first switch valve 208 is opened and the second switch valve 209 is closed. Accordingly, the refrigerant flows in the cooling circuit 202a. Further, the electromagnetic clutch mechanism 17 is excited to drive the compressor 201. The compressor 201 compresses the refrigerant gas. The temperature of the gas is increased, accordingly. The high temperature, high pressure gas is cooled and liquefied by the condenser 203. The liquefied refrigerant is vaporized by the evaporator 205 while absorbing heat from the ambient air. This cools the air in the duct T, which flows into the passenger compartment. The amount of liquefied refrigerant flowing into the evaporator 205 is controlled by the expansion valve 204.

When the compartment temperature is far higher than the set temperature, that is when the need for cooling is great, the computer 300 controls the control valve 32 to maximize the displacement of the compressor 201. When the difference between the compartment temperature and the set temperature is small, that is, when the need for cooling is small, the computer 300 controls the control valve 32 to minimize the displacement of the compressor.

If the need for cooling is great when the compressor 201 starts operating, the computer 300 immediately excites the control valve 32 to shut the supply passage 31 thereby maximizing the displacement. However, since the pressures in the chambers of the compressor become equalized at a relatively low pressure if the nonoperational state of the compressor continues, the pressure of the discharge chamber 25 (the high pressure chamber 44) is relatively low. This advances the timing at which the discharge valve flaps 29 are opened. Thus, the pressure of the cylinder bores 12a is not sufficiently raised to increase the inclination of the swash plate 20.

However, if the difference between the pressure of the discharge chamber 25 and the pressure of the suction chamber 24 is smaller than the predetermined value, that is, if the pressure of the high pressure chamber 44 and the pressure in the low pressure chamber 45 is smaller than the predetermined value, the discharge passage 40 is closed by the throttle 41. That is, the discharge chamber 25 is disconnected from the external refrigerant circuit 202. Thus, when the compressor 201 starts operating, compressed refrigerant gas remains in the discharge chamber 25, which has a relatively small volume. Therefore, even if the displacement is minimum and the stroke of the pistons 22 is short, the pressure of the discharge chamber 25 is quickly increased. This delays the timing at which the discharge valve flaps 29 are opened and quickly increases the pressure of the cylinder bores 12a. Accordingly, the swash plate 20 is quickly moved from the minimum inclination to the maximum inclination. In other words, the displacement of the compressor is quickly maximized.

When the pressure of the discharge chamber 25 is increased and the difference between the discharge chamber 25 and the pressure in the suction chamber 24 becomes equal or greater than the predetermined value, the throttle 41 opens the discharge passage 40. This allows compressed refrigerant gas to flow to the external refrigerant circuit 202.

When the compartment temperature becomes equal to the set temperature, the electromagnetic clutch 17 disconnects the compressor from the engine Eg thereby stopping the compressor 201. The pressures in the chambers of the compressor become equalized at a relatively low pressure, and the inclination of the swash plate 20 is minimized by the spring 18. Therefore, when the compressor 201 starts operating, the swash plate 20 is at the minimum inclination, which requires minimum torque. The shock caused by starting the compressor 201 is thus almost eliminated.

The heating mode will now be described. In the heating mode, the main heater mainly operates. The electromagnetic valve 104 opens the feed pipe 102. Then, coolant heated by the engine Eg is supplied to the heater core 101 from the water jacket. The heat of the coolant is radiated at the heater core 101 and warms air in the duct T.

If the temperature of the coolant is relatively low, for example, immediately after the engine Eg is started, the main heater cannot effectively function. Therefore, if the coolant temperature detected by the temperature sensor 301 is lower than a predetermined value, the computer 300 shuts the first switch valve 208 and opens the second switch valve 209 to use the cooler 200 as an auxiliary heater. This switches the external refrigerant circuit 202 to the heating circuit 202b. Further, the computer 300 activates the electromagnetic clutch mechanism 17 to start the compressor 201. The computer 300 excites the control valve 32 to shut the supply passage 31, which maximizes the compressor displacement.

However, if the nonoperational state of the compressor 201 has continued for a significant time, the pressures in the chambers of the compressor 201 have become equalized at a relatively low pressure. Thus, the pressure of the discharge chamber 25 (the high pressure chamber 44) is low. Therefore, the discharge valve flaps 29 are opened at a relatively advanced timing, which prevents the pressure in the cylinder bores 12a from being raised sufficiently high to increase the inclination of the swash plate 20.

If the difference between the pressure in the discharge chamber 25 and the pressure of suction chamber 24 is smaller than the predetermined value, the throttle 41 closes the discharge passage 40. Compressed refrigerant gas is therefore stored in the discharge chamber 25, which has relatively small volume. This quickly increases the pressure of the discharge chamber 25 even if the displacement is the smallest or if the temperature about the evaporator is low. The pressure increase in the discharge chamber 25 delays the timing at which the discharge valve flaps 29 are opened, which quickly increases the pressure of the cylinder bores 12a. As a result, the inclination of the swash plate 20 is quickly changed from the minimum to the maximum, and the displacement of the compressor is quickly maximized. When the pressure of the discharge chamber 25 is increased, and the pressure difference between the discharge chamber 25 and the suction chamber 24 becomes greater than the predetermined value, the throttle 41 opens the discharge passage 40. Then, high temperature, high pressure refrigerant gas is supplied to the external refrigerant circuit 202. The heated gas flows in the bypass 206 and is depressurized by the orifice 207. The gas is then conducted to the evaporator 205. The evaporator 205 transfers the heat of the gas to the air in the duct T, thereby adding to the heat generated by the heater core 101 of the main heater. The air in the duct T is therefore sufficiently warmed. When the amount of refrigerant cooled and liquefied by the evaporator 205 is excessive, the accumulator 210 temporarily stores the liquefied refrigerant. The accumulator 210 prevents the liquefied refrigerant from flowing back to the compressor 201.

Once the engine Eg is warmed and the temperature of the coolant detected by the coolant temperature sensor 301 is higher than a predetermined value, the computer 300 de-activates the electromagnetic clutch 17, which deactivates the auxiliary heater, or the refrigerant circuit 200. The clutch 17 disconnects the compressor 201 from the engine Eg and thus stops the compressor 201. Thereafter, the heating is performed only by the main heater.

When the compressor 201 is stopped, the pressures in the chambers of the compressor 201 become equalized. Accordingly, the swash plate 20 is moved to the minimum inclination position by the spring 18. Therefore, when the clutch 17 connects the commpressor 201 to the engine Eg again, the compressor 201 starts operating with the swash plate 20 at the minimum inclination. This requires only minimum torque. The shock caused by starting the compressor 201 is thus reduced The air conditioning system of the preferred embodiment has the following advantages.

The throttle 41 reduces the cross-sectional area of the discharge passage 40 thereby quickly increasing the pressure of the discharge chamber 25 and the cylinder bores 12a when the compressor 201 starts operating. Therefore, when the displacement is minimum or when the ambient temperature is low, the air conditioning system performs its maximum cooling or heating immediately after starting.

When the difference between the pressure of the discharge chamber 25 and the pressure of the suction chamber 24 is smaller than the predetermined value, the throttle 41 completely closes the discharge passage 40 thereby disconnecting the discharge chamber 25 from the external refrigerant circuit 202. Therefore, when the compressor 201 is started, the pressure of the discharge chamber 25 and the pressure of the cylinder bores 12a are quickly increased.

The air conditioning system of the preferred embodiment is different from the prior art system only by the throttle 41 of the compressor 201. That is, replacing a conventional compressor with the compressor 201 results in the air conditioning system of the present invention. The present invention is therefore inexpensive.

The throttle 41 automatically varies the cross-sectional area of the discharge passage 40 in accordance with the difference between the pressure of the discharge chamber 25 and the pressure in the suction chamber 24. In other words, the throttle 41 does not need to be controlled by a separate controller. This reduces the size and the weight of the throttle 41, which reduces the size and the weight of the compressor 201.

Figure 5A:
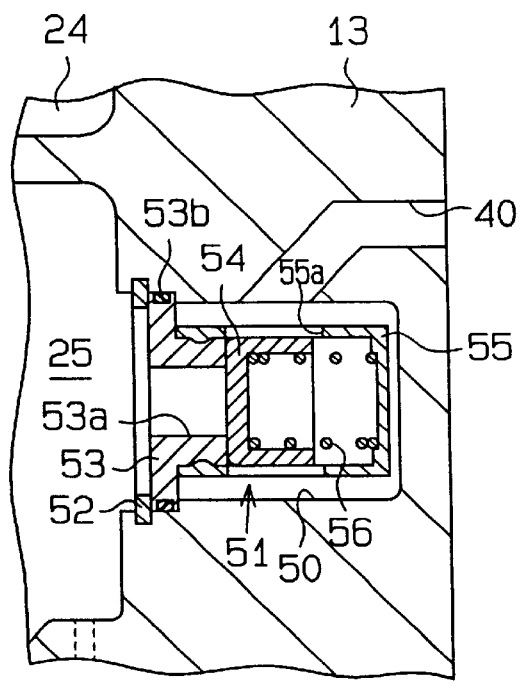
FIG. 5a is an enlarged partial cross-sectional view illustrating a throttle closing a discharge passage according to a second embodiment of the present invention.
Figure 5B:
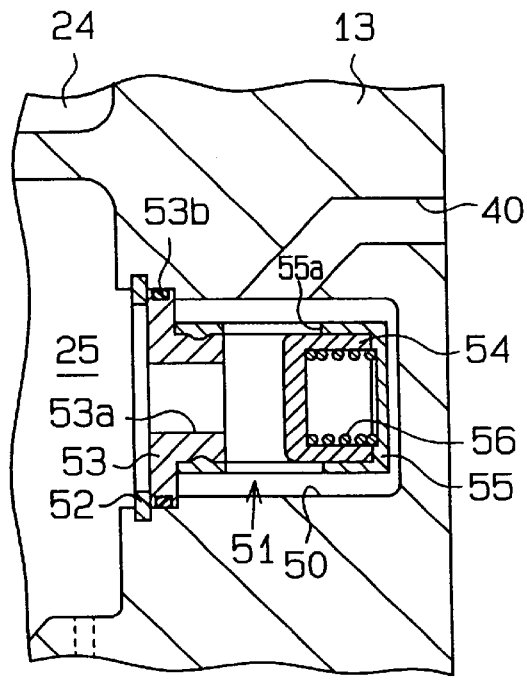
FIG. 5b is an enlarged partial cross-sectional view illustrating the throttle of FIG. 5a opening the discharge passage.
Figure 6:
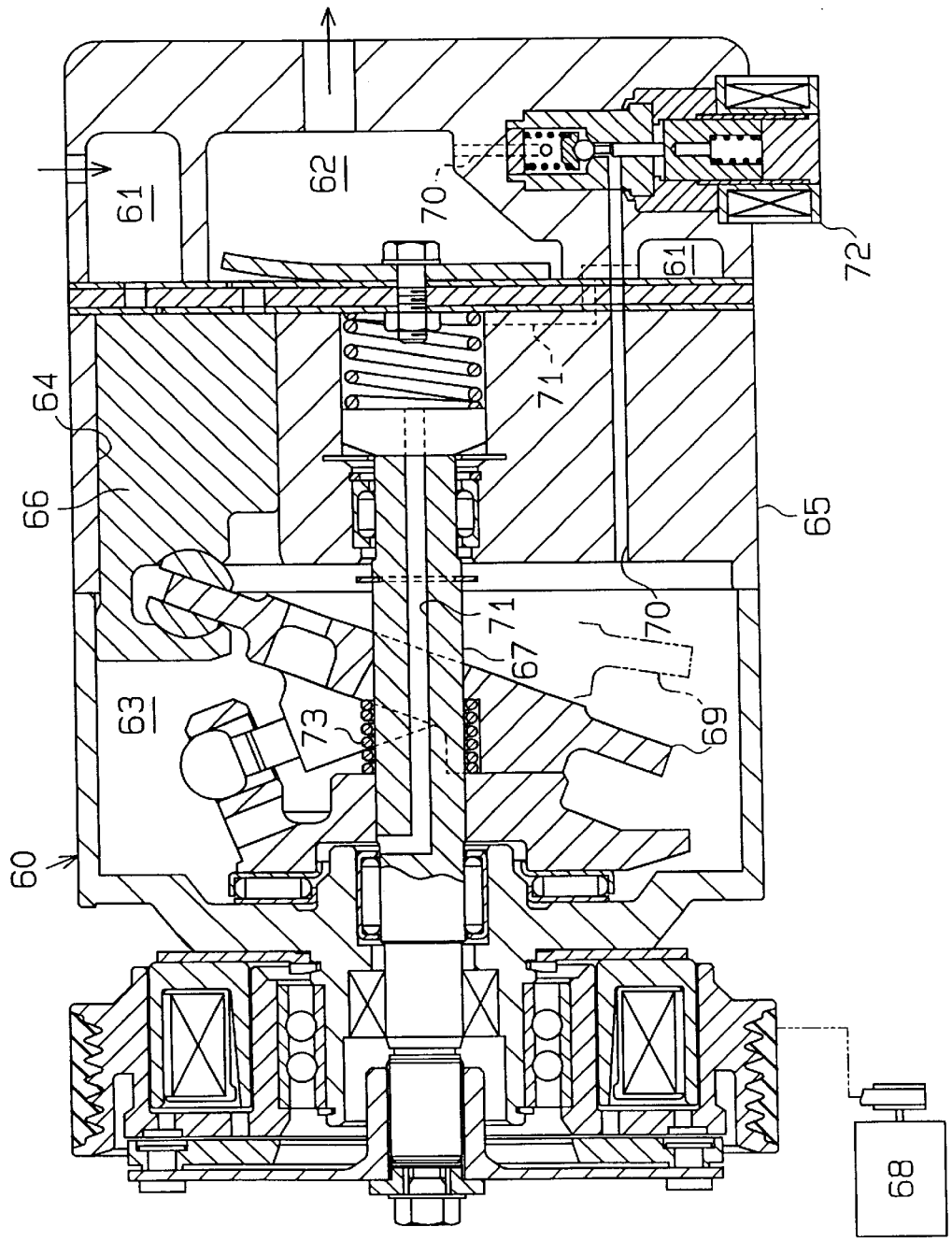
FIG. 6 is a cross-sectional view illustrating a variable displacement compressor used in a prior art air conditioning system.

FIGS. 5a and 5b show a throttle valve according to a second embodiment. The differences from the embodiment of FIGS. 1–4 will mainly be discussed below, and like or the same reference numerals are given to those components that are like or the same as the corresponding components of the embodiment of FIGS. 1 to 4.

A recess 50 is formed in the rear housing 13. The recess 50 is located in the discharge passage 40. A throttle valve 51 is accommodated in the recess 50. The throttle valve 51 is a differential pressure valve and also functions as a check valve. The throttle valve 51 includes a casing 55, a valve body 54, a valve seat 53 and a spring 56. The casing 55 has a hole 55a through its wall connecting the interior of the casing 55 with the periphery of the recess 50. The valve seat 53 is secured to the casing 55. The valve body 54 is 30 reciprocally housed in the casing 55. The spring 56 is accommodated in the casing 55 to urge the valve body 54 toward the valve seat 53. The valve hole 53a is formed in the valve seat 53. The valve hole 53a constitutes part of the discharge passage 40. When contacting the valve seat 53, the valve body 54 closes the valve hole 53a.

The throttle valve 51 is an assembly of the casing 55, the valve body 54, the valve seat 53 and the spring 56. When the throttle valve 51 is inserted in the recess 50, the casing 55 enters first. An O-ring 53b seals the space between the valve seat 53 and the wall of the recess 50. A snap ring 52 prevents the throttle valve 51 from disengaging from the recess 50.

The throttle valve 51 adjusts the opening of the discharge passage 40 in accordance with the difference between the pressure of the discharge chamber 25, or a discharge pressure zone, and the pressure in the external refrigerant circuit 202, or a low pressure zone. When the pressure of the discharge chamber 25 is low, the difference between the discharge chamber 25 and the pressure of the discharge passage 40 is small. If the pressure difference is smaller than a predetermined value, the spring 56 causes the valve body 54 to contact the valve seat 53, which closes the discharge passage 40 (the valve hole 53a). If the pressure of the discharge chamber 25 is high and the pressure difference between the discharge chamber 25 and the discharge passage 40, or an external piping, is equal to or greater than the predetermined value, the valve body 54 is separated from the valve seat 53 against the force of the spring 56. This opens the discharge passage 40 (the valve hole 53a).

When the compressor 201 is not operating, the pressures in the chambers of the compressor 201 become equalized at a relatively low pressure. At this time, the difference between the pressure of the discharge chamber 25 and the pressure of the external piping connected to the recess 50 is smaller than the predetermined value. Accordingly, the throttle valve 51 closes the discharge passage 40. As a result, when the compressor 201 is started, the pressure of the discharge chamber 25 is quickly increased. Thus, the compressor 201 quickly maximizes the displacement.

The embodiment of FIGS. 5a and 5b has the same advantages as the embodiment of FIGS. 1 to 4.

It should be apparent to those skilled in the art that the present invention may be embodied in many other specific forms without departing from the spirit or scope of the invention. Particularly, it should be understood that the invention may be embodied in the following forms.

The throttles 41, 51 may be electromagnetic valves. In this case, a pressure sensor is used to detect the pressure of the discharge chamber 25. The computer 300 closes the throttle when the detected pressure of the discharge chamber 25 is smaller than a predetermined value, thereby reducing the cross-sectional area of the discharge passage 40.

If the throttles 41, 51 are electromagnetic valves, the throttle may be controlled in synchronization with activation of the electromagnetic clutch 17. In this case, the cross-sectional area of the discharge passage 40 is maintained small for a predetermined period after the clutch 17 is activated. This construction requires no sensor for detecting the pressure of the discharge chamber 25.

In the embodiment of FIGS. 1 to 4, the low pressure chamber 45 of the throttle 41 may be communicated with the atmosphere.

A control valve may be provided in the bleeding passage 30. In this case, the control valve 32 may be or may not be located in the supply passage 31.

The variable displacement compressor 201 may be a wobble plate type compressor.

Therefore, the present examples and embodiments are to be considered as illustrative and not restrictive and the invention is not to be limited to the details given herein, but may be modified within the scope and equivalence of the appended claims.

What is claimed is:

1. An air conditioning system for cooling or heating a space, the system comprising:
  a compressor having a system for drawing in refrigerant gas, compressing the gas, and discharging the gas after compression;
  a port for supplying the commpressed gas to an external circuit; wherein the external circuit includes:
    a heat exchanger for cooling or heating air supplying to the space;
  a cooling circuit including a condenser that condenses the compressed refrigerant gas, wherein the cooling circuit supplies the condensed refrigerant gas to the heat exchanger;
    a heating circuit for optionally supplying the compressed refrigerant gas to the heat exchanger; and
    a selecting valve apparatus for selectively connecting the cooling circuit or the heating circuit to the heat exchanger, and
  a control valve for changing the cross-sectional area of the port to lower the discharge amount of the compressed refrigerant gas discharged from the compressor.

2. The air conditioning system according to claim 1, wherein the compressor has a suction pressure zone, into which refrigerant gas is drawn, and a discharge pressure zone, from which compressed refrigerant gas is discharged, and wherein the control valve reduces the discharge amount of the compressed refrigerant gas when the difference between the pressure in the discharge pressure zone and that of the suction pressure zone is less than a predetermined value.

3. The air conditioning system according to claim 2, wherein the port connects the discharge pressure zone to the cooling circuit or the heating circuit, wherein the control valve comprises:
   a first chamber communicated with the suction pressure zone;
   a second chamber communicated with the discharge pressure zone; and
   a valve body located between the first chamber and the second chamber for regulating the port in accordance with the difference between pressure in the suction pressure zone and that of the discharge pressure zone.

4. The air conditioning system according to claim 3, wherein the valve body moves between an open position at which the control valve opens the port, and a closed position at which the control valve closes the port, wherein the valve body has a through hole that is aligned with the port when the valve body is located at the open position.

5. The air conditioning system according to claim 4, wherein the control valve further comprises a spring accommodated in the first chamber for urging the valve body to the closed position.

6. The air conditioning system according to claim 5, wherein the control valve closes the port when the difference between the pressure in the first chamber and that of the second chamber is smaller than the predetermined value, and opens the port when the pressure difference is equal to or greater than the predetermined value.

7. A variable displacement compressor for compressing refrigerant gas comprising:
   a compression mechanism for compressing the refrigerant gas;
   a crank chamber for accommodating the compression mechanism;
   a suction pressure zone into which refrigerant gas having relatively low pressure is drawn when the compression mechanism operates;
   a discharge pressure zone into which compressed refrigerant gas having relatively high pressure is delivered when the compression mechanism operates;
   a port for supplying the compressed gas to an external circuit; and
   a control valve for changing the cross-sectional area of the port to lower the discharge amount of the refrigerant gas discharged from the compressor, wherein the control valve is located in association with the port, wherein the control valve includes:
      a first chamber communicated with the suction pressure region;
      a second chamber communicated with the discharge pressure region; and
      a valve body located between the first chamber and the second chamber for regulating the port in accordance with the difference between pressure in the suction pressure zone and that of the discharge pressure zone.

8. The compressor according to claim 7, wherein the control valve lowers the cross-sectional area of the port when the difference between the pressure in the discharge pressure zone and that of the suction pressure zone is less than a predetermined value.

9. The compressor according to claim 7, wherein the valve body moves between an open position at which the control valve opens the port, and a closed position at which the control valve closes the port, wherein the valve body has a through hole that is aligned with the port when the valve body is located at the open position.

10. The compressor according to claim 7, wherein the control valve closes the port when the difference between the pressure in the first chamber and that of the second chamber is smaller than the predetermined value, and opens the port when the pressure difference is equal to or greater than the predetermined value.

11. The compressor according to claim 10, wherein the control valve further comprises a spring accommodated in the first chamber for urging the valve body to the closed position.

12. The compressor according to claim 7 further comprising a means for minimizing the displacement of the compressor when the compressor is stopped.

13. An air conditioning system for cooling or heating a space, the system comprising:
   a variable displacement compressor for compressing refrigerant gas, wherein the compressor includes a compression mechanism for compressing the refrigerant gas, a crank chamber for accommodating the compression mechanism, a suction pressure zone into which refrigerant gas having relatively low pressure is drawn when the compression mechanism operates, a discharge pressure zone into which compressed refrigerant gas having relatively high pressure is delivered when the compression mechanism operates, and a port for supplying the compressed gas to an external circuit,
   wherein the external circuit comprises a heat exchanger for cooling or heating air supplying to the space, a cooling circuit including a condenser that condenses the compressed refrigerant gas, wherein the cooling circuit supplies the condensed refrigerant gas to the heat exchanger, a heating circuit for optionally supplying the compressed refrigerant gas to the heat exchanger, and a selecting valve apparatus for selectively connecting the cooling circuit or the heating circuit to the heat exchanger; and
   a control valve for changing the cross-sectional area of the port to lower the discharge amount of the refrigerant gas discharged from the compressor, wherein the control valve is located in association with the port, wherein the control valve includes:
      a first chamber communicated with the suction pressure region;
      a second chamber communicated with the discharge pressure region; and
      a valve body located between the first chamber and the second chamber for regulating the port in accordance with the difference between pressure in the suction pressure zone and that of the discharge pressure zone.

14. The air conditioning system according to claim 13, wherein the control valve lowers the cross-sectional area of the port when the difference between the pressure in the discharge pressure zone and that of the suction pressure zone is less than a predetermined value.

15. The air conditioning system according to claim 13, wherein the valve body moves between an open position at which the control valve opens the port, and a closed position at which the control valve closes the port, wherein the valve body has a through hole that is aligned with the port when the valve body is located at the open position.

16. The air conditioning system according to claim 13, wherein the control valve closes the port when the difference between the pressure in the first chamber and that of the second chamber is smaller than the predetermined value, and opens the port when the pressure difference is equal to or greater than the predetermined value.

17. The air conditioning system according to claim 13, wherein the control valve further comprises a spring accommodated in the first chamber for urging the valve body to the closed position.

18. The air conditioning system according to claim 13 further comprising a means for minimizing the displacement of the compressor when the compressor is stopped.

19. The air conditioning system according to claim 13, wherein the space includes a passenger compartment in a vehicle.

* * * * *

UNITED STATES PATENT AND TRADEMARK OFFICE
CERTIFICATE OF CORRECTION

PATENT NO. : 6,250,093 B1
DATED : June 26, 2001
INVENTOR(S) : Toshiro Fujii et al.

It is certified that error appears in the above-identified patent and that said Letters Patent is hereby corrected as shown below:

<u>Title page,</u>
Item [57], ABSTRACT,
Lines 3-4, please change "as an auxially heater" to -- as an auxiliary heater --;

<u>Column 9,</u>
Lines 36-37, please change "valve body 54 is 30 reciprocally housed" to -- valve body 54 is reciprocally housed --.

Signed and Sealed this

Twenty-seventh Day of August, 2002

Attest:

Attesting Officer

JAMES E. ROGAN
*Director of the United States Patent and Trademark Office*